United States Patent [19]

de Jager

[11] Patent Number: 4,839,199
[45] Date of Patent: Jun. 13, 1989

[54] METHOD AND APPARATUS FOR APPLYING POWDERED MATERIALS TO FILAMENTS

[75] Inventor: Gui G. de Jager, Noordwyk, Netherlands

[73] Assignee: Flexline Services Ltd., Nicosia, Cyprus

[21] Appl. No.: 36,673

[22] PCT Filed: Jul. 10, 1986

[86] PCT No.: PCT/NL86/00019
§ 371 Date: Apr. 17, 1987
§ 102(e) Date: Apr. 17, 1987

[87] PCT Pub. No.: WO87/00563
PCT Pub. Date: Jan. 29, 1987

[30] Foreign Application Priority Data

Jul. 16, 1985 [NL] Netherlands .................. 8502045
Oct. 29, 1985 [NL] Netherlands .................. 8502947

[51] Int. Cl.⁴ .................. B05D 1/10; B05D 1/22
[52] U.S. Cl. .................. 427/185; 427/195; 118/308; 118/312; 118/316; 118/325
[58] Field of Search .......... 118/308, 312, 314, 316, 118/323, 325; 156/441, 180; 427/185, 195

[56] References Cited

U.S. PATENT DOCUMENTS

| | | | |
|---|---|---|---|
| 3,027,869 | 4/1962 | Ball | 118/316 |
| 3,172,777 | 3/1965 | Pano et al. | 118/316 |
| 3,189,506 | 6/1965 | Cobb et al. | 156/441 X |
| 3,339,357 | 9/1967 | Marzocchi et al. | 118/325 X |
| 3,390,039 | 6/1968 | Caughman et al. | 156/441 X |
| 3,439,649 | 4/1969 | Probst et al. | 118/312 |
| 3,589,333 | 6/1971 | Quackenbush | 118/308 |
| 3,830,638 | 8/1974 | Jumentier et al. | 118/308 |
| 4,263,871 | 4/1981 | Gibson | 118/312 |
| 4,472,224 | 9/1984 | Pryor | 156/441 X |
| 4,640,219 | 2/1987 | Anderson et al. | 118/308 X |

FOREIGN PATENT DOCUMENTS

| | | |
|---|---|---|
| 025543 | 3/1981 | European Pat. Off. . |
| 961989 | 6/1964 | United Kingdom . |
| 1259085 | 1/1972 | United Kingdom . |
| 2074052 | 10/1981 | United Kingdom . |

*Primary Examiner*—Shrive Beck
*Attorney, Agent, or Firm*—Zarley, McKee, Thomte, Voorhees & Sease

[57] ABSTRACT

The present invention is directed towards a method and apparatus for treating materials consisting of a plurality of monofiliments with a treating agent. The treating agent is suspended in streams which are directed to the material from various directions and under a controllable pressure so as to separate the monofiliments and thereby expose the individual monofiliments to the treating agent. The streams of treating agent are directed to the material with application of the Venturi principle. The streams of treating agent may be applied in a reciprocating manner.

8 Claims, 3 Drawing Sheets

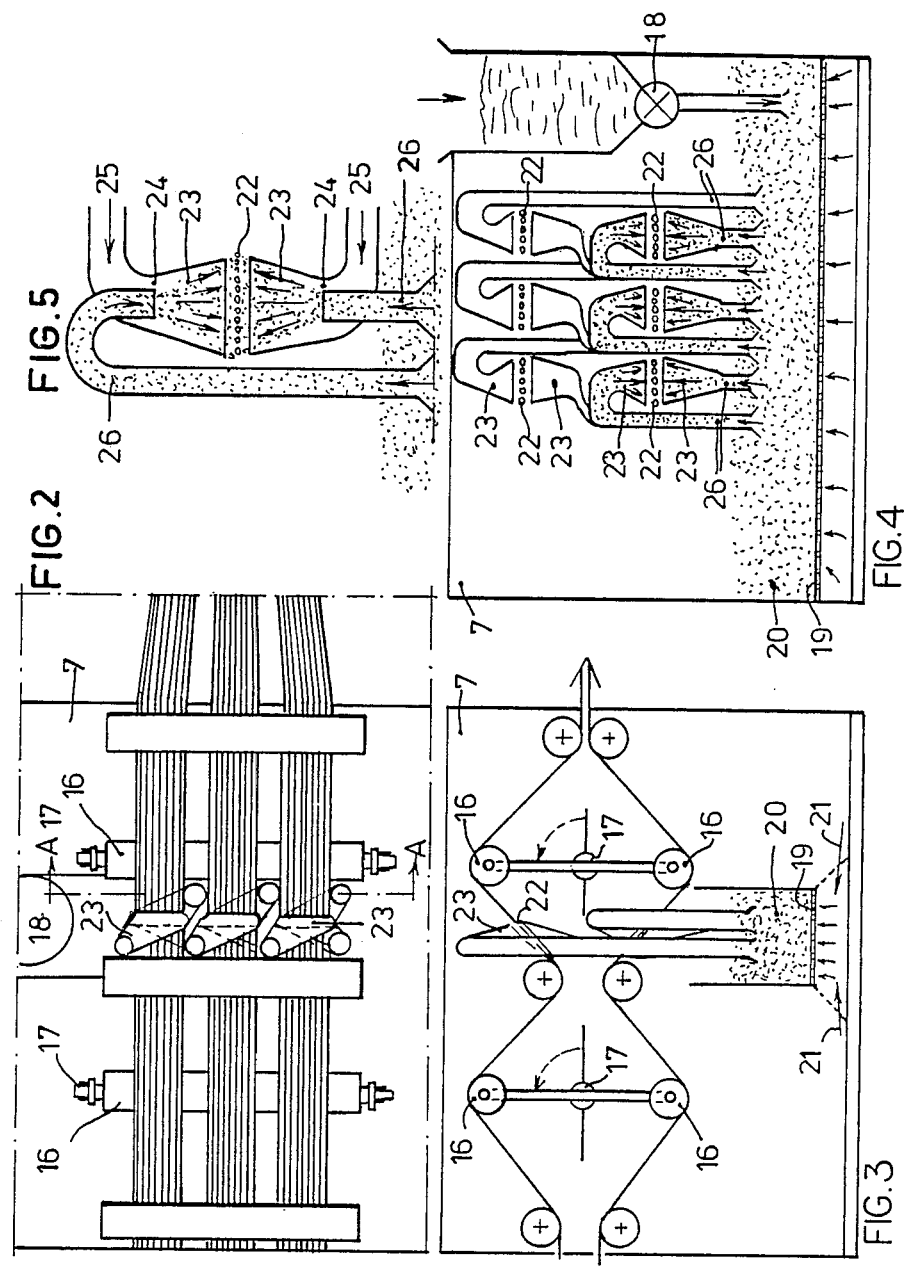

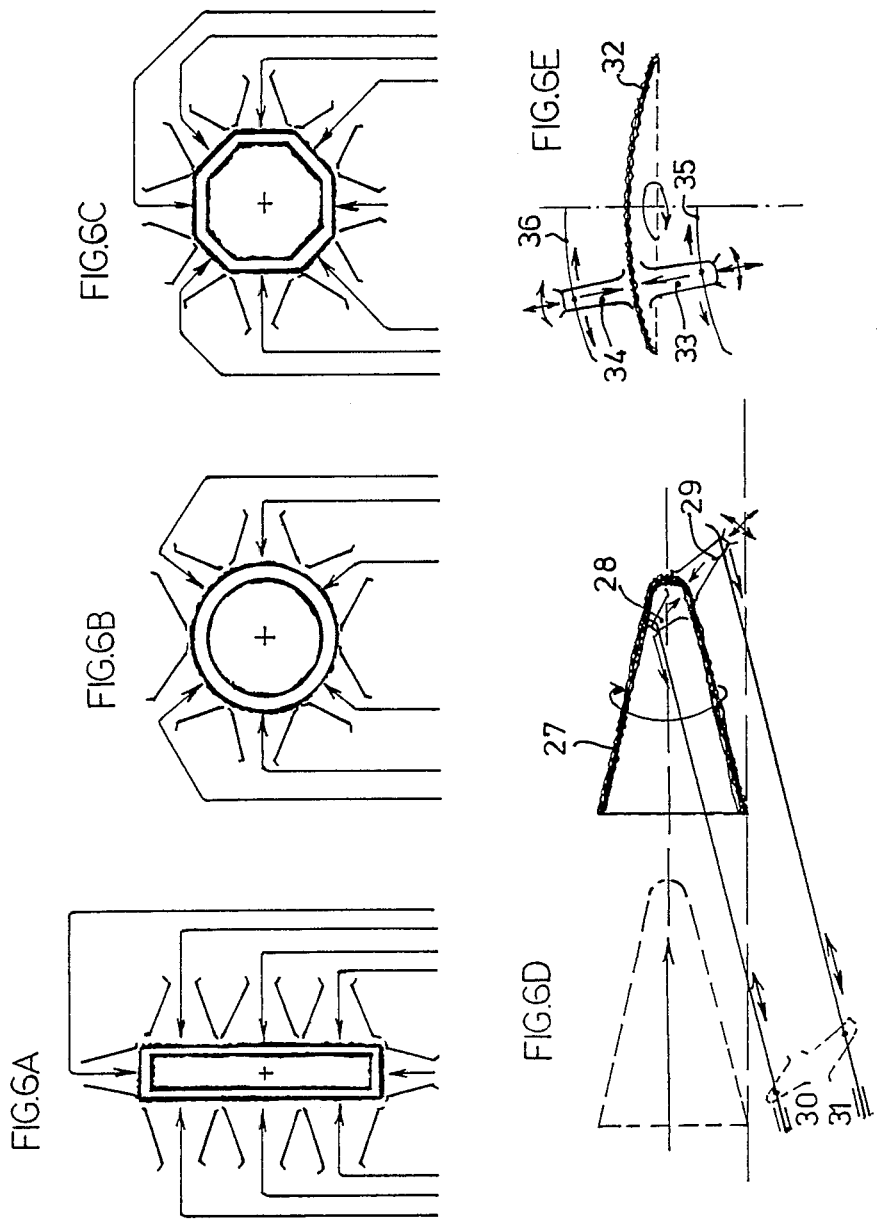

METHOD AND APPARATUS FOR APPLYING POWDERED MATERIALS TO FILAMENTS

The invention relates to a process and a device for treating threads, slivers or the like consisting of various filaments and optionally processed in a tissue or knitwear with a treating agent, a separation between the filaments being effected in order to have the agent better penetrate into the structure of filaments.

Similar processed and devices are generally known, in particular for the production of composed materials consisting of thermoplastic or thermosetting substances, wherein filaments function as reinforcing material. For instance in Dutch patent application No. 70 01623 a process is described, wherein the threads of slivers consisting of a great number of filaments are separated before a synthetic resin in powder form is applied thereon, whereupon this resin is molten in result of which a coherent product is obtained. The spreading of the filaments in the slivers is for instance effected according to the Dutch patent application by giving to the filaments an electrostatic charge with the same sign. According to another embodiment the slivers are passed through a venturi, which in the same direction is passed by a fluid at a high velocity. The spreading of the filaments occurs then under the influence of the relaxation of the fluid on leaving the venturi.

The invention provides for a process as mentioned in the preamble, which is characterized in that the treating agent is suspended in one or more gas or liquid streams which are then directed to the material to be treated under controllable pressure.

It has turned out that in this way a very efficient spreading of the filaments is effected, as a result of which impregnating material suspended in the streams of fluid penetrates well between the filaments and impregnate same very homogeneously. This results in the final product, for instance a sheet of plastic material reinforced by filaments, being of a very homogenous composition.

The process according to the invention is applicable no matter what the nature of the filiments or the nature of the impregnating agent is.

For instance, powdery cermic products and metal products are considered as impregnating materials in addition to thermoplastic or thermosetting materials.

The process according to the invention is also feasible for the application of layers of impregnating material of various thicknesses on various sides of the material to be impregnated. For instance a tissue or knitwear which is applied internally or externally to a lightweight core can be impregnated by application of the invention.

As treating agent a grinding material can also be used, which makes the material treated with it rough, in result of which it is made better suitable for the adherence to it of a sizing and the like.

It is preferred to direct the gas streams wherein the treating material is suspended with applications of the venturi principle to the material to be treated.

The treating material can be suspended in a gas stream in various ways, for instance by atomizing it in the gas stream as a melt or liquid. It is also possible to dose a powdery treating material directly into a gas or liquid stream from a container. It is also possible to suspend the treating material in a fluidized bed in a gas and to withdraw the gas streams to be directed to the material to be treated from the fluidized bed by suction power. Per se the application of a fluidized bed for the impregnation of bundles of filaments is known, for instance from Dutch patent specification 151 928. In this known method, however, the material to be impregnated is passed through the fluidized bed of impregnating material.

If, however, in the process according to the invention a fluidized bed is applied, the actual impregnation occurs outside this bed.

The invention also relates to a device for carrying out the invented process with a space wherein via a perforated bottom a gas can be fed and a supply-pipe for powdery treating agent, said device being characterized in that the said space is provided with one or more suction pipings, which on the discharge side debouch into means which are reciprocable movable transversely to the path which the material to be treated covers during operation of the device. If the gas is directed to the material to be treated from various sides, care can be taken that the gas streams do not fully collide with each other.

It is also possible, applying the invention, to apply various impregnating materials, either over each other, or to various faces, in several spaces separated from each other, in order to prevent an undesirable mixing of the various impregnating materials.

The invention will be illustrated hereinunder by way of example with the aid of the following description as well as the enclosed figures.

FIG. 2 is a top view of the device according to the invention.

FIG. 3 is a side view of the very same device.

FIG. 4 is a cross-section A.A of the very same device.

FIG. 5 is an enlarged representation of an essential part of the device according to FIGS. 2, 3 and 4.

Figure 1:
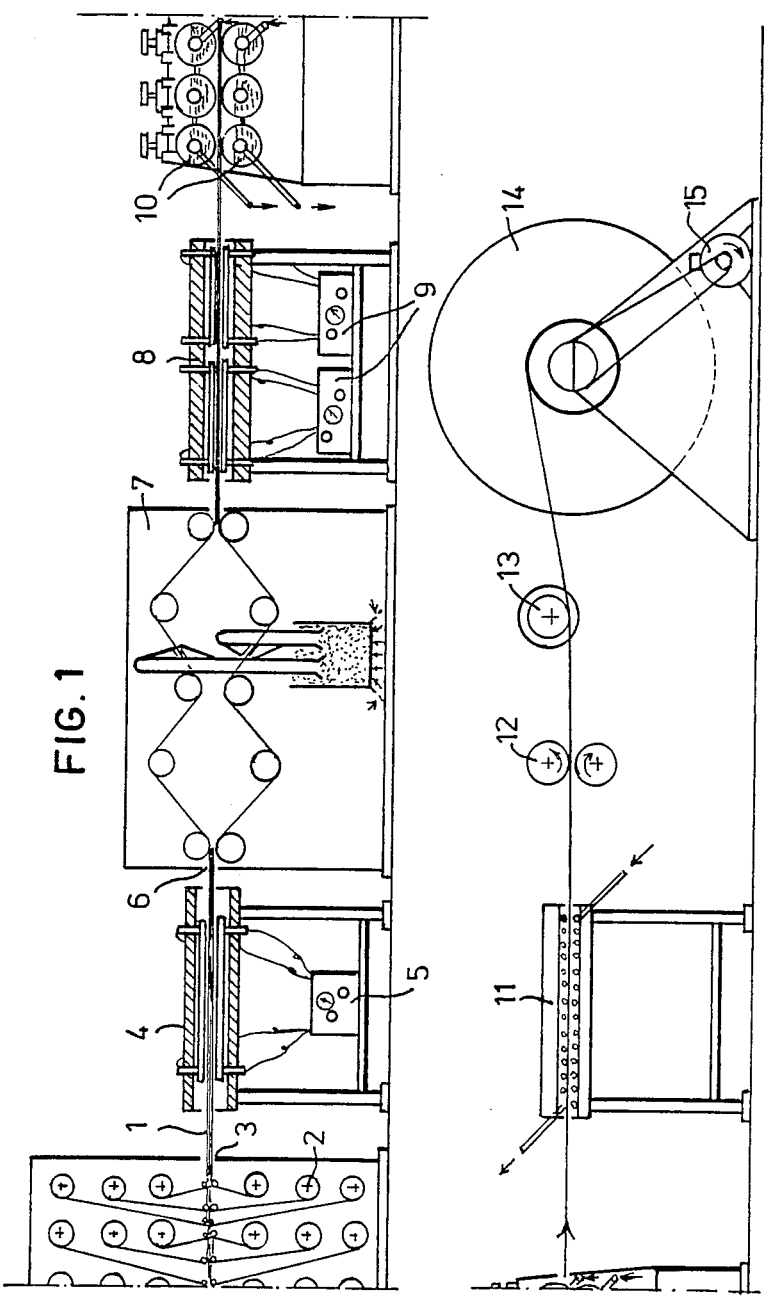
FIG. 1 is a side view in cross-section of a schematically drawn installation for carrying out the process.

FIG. 6 gives a number of variants a-e incl. of the application of the invention.

As represented in FIG. 1 widths of continuous filament beams 1 are formed by unwinding them from the horizontal coils 2 under automatically maintained controllable tension. Via the guiding 3 the bundles come into the preheating oven 4. The oven is heated with the automatically controllable heat source 5. Then the dried and preheated filament beams are passed through a thermally isolated receptacle 7, via the guiding 6, where impregnation takes place (FIG. 2-6 incl.). Thereupon the bundles are passed via the melting furnace 8, wherein one or more heating bodies are applied controlled by thermocouples. Same are automatically controlled by the means 9 at a predetermined heating intensity. Thereupon the filament bundles are formed into bands and passed through a cooling means 11 via cooled forming rollers 10 and wound on the collecting coil 14 via delivering rollers 12 and the guiding 13. This coil is driven by the electromotor 15. After the delivering rollers 12 the band of filaments can also further be processed for instance by cutting it longitudinally and/or transversely.

The installation for carrying out the process can, if desired, be carried out wholly or partly vertically.

In the device according to FIGS. 2-5 incl. the bundles of filaments in the thermally isolated impregnation receptacle 7 are distributed over the rollers 16, which are postioned outside the feeding axes.

Optionally the axes of the rollers 16 are mounted pivotally about the shaft 17 pair-wise. This makes it possible that the bundles can be positioned in the centerline when they are pulled into the device. Speading of the bundles over more than one layer of rollers, in this case two, facilities a better distribution of the filaments. After having passed the rollers the filaments are impregnated. The powdery impregnating material which is fed from the dosing device 18, is fluidized in the bed 20 in gas 21 fed through the perforated bottom 19.

Preferably this gas is preheated. In the spaces 22 under the influence of pumping action, gas streams wherein the impregnating material is suspended are sucked under controllable pressure from the fluidized bed to the impregnating heads 23, from which it is directed to the continuously moving bundles of filaments. In order to effect an optimal impregnation the impregnating heads 23 are optionally adjustable with respect to distance and/or angle turning in regard of the material to be impregnated.

The various parts which are applied in the impregnating receptacle 7 can simply be displaced and/or replaced. For instance other types or rollers, and/or other impregnating heads can be used for the impregnation of various types of material.

The gas streams with therein the finely divided impregnating material are preferably directed to the filaments to be impregnated from two or more impregnating heads. This results in a very homogeneous distribution of the impregnating material over the individual filaments. The impregnating method described makes it possible to operate with a considerably lower filament tension then required in a mechanical impregnating system, in which the impregnating material is pressed between the filaments by means of pressure rollers. The lower filament tension results in the substantial elimination of filament rupture which often occurs in the mechanical impregnation of for instance carbon filaments. This combined with the more intensive impregnation also makes a greater impregnation rate possible.

In FIG. 5 it is indicated that the suction of the gas wherein the impregnating material is suspended occurs through the conduit 26 with application of the venturi principle. Via the conduits 25 gas is fed under a controllable pressure. It is preferred to suck the gas fed by a pump through the conduit 25 from the space 7.

In result a circulation pump system of the gas is obtained and heat losses are prevented.

If no use is made of a fluidized bed it is advantageous to connect the dosing device 18 directly to the impregnating heads or their supply mains.

When using impregnating liquids it is preferred to inject the liquid either directly into the impregnating head(s) or to suck it directly from the dosing device 18.

In FIG. 6 a plurality of schemes of embodiments of more-sided and/or mobile impregnating heads are represented, which are suitable for the continuous impregnation of bundles of filaments optionally processed in a tissue or knitwear. These bundles are optionally applied to cores. These may have the following shapes:
  a. rectangular,
  b. cylindrical,
  c. honeycomb-shaped.

For the internal impregnation of hollow structures fully closed along their circumference, which are provided with filament materials, the process must be discontinuous. Then impregnating heads can be applied in the hollow spaces. Then the impregnating heads and/or the material to be impregnated can be moved in such a way that the desired impregnation is attained. This is further illustrated with the aid of FIGS. 6e and d.

FIG. 6 d represents an aeroplane nose 27, which internally and externally is provided with filament material that has to be impregnated. For the internal impregnation use is made of the impregnating head 28 and for the external impregnation of the impregnating head 29. By rotating the nose and reciprocate the impregnating heads 28 and 29 over guidings 30 and 31 the desired impregnation is obtained.

In FIG. 6e 32 represents part of a dish antenna internally and externally is provided with filament material that has to be impregnated. This occurs by means of the impregnating heads 33 and 34, which are reciprocated radially via guidings 35 and 36. If desired, the motions described can be computer controlled, which makes possible an optimal impregnation of more complex types of material.

If bundles of filaments processed into tissues or knitwears are applied to cores, the impregnated material is heated in an autoclave under a predetermined desired pressure. Optionally, heat emitters can be built in in the autoclave.

According to the afore-described way impregnated filament bands optionally woven into a certain shape can be treated to aeroplane noses, radar domes and other structures. It is also possible to apply a melting furnace consisting for instance of two mould halves for heating.

In order to facilitate weaving, knitting and/or twisting with impregnated filament bands can be separated wholly or partly into narrower bands. These narrow bands are then provided with an additional thin imprenating layer with application of the process according to the invention. This layer consisting of a specially selected impregnating material sees to it that the impregnating material already present between the filament remains in place during weaving and/or knitting and besides prevents the adsorption of moisture. In order to effect this the band may optionally be subjected to for instance a temperature treatment on the surface. Particularly in case of impregnating materials of high rigidity the weaving and/or knitting with narrow bands, which have not been passed through a melting furnace, is possible without a considerable adaptation of the installations in question and loss of velocity. Then the tissue, knittwear and/or twisted material can be passed through a melting furnace in order to be processed further optionally via cooled form rollers.

As treating agents may for instance be used:
Acetal resins
Acrylic resins
Acrylonitrile-butadiene-styrene resins
Aluminium
Alkyd resins
Aluminia
Aryl resins
Bismaleimide resins
Cobalt
Copper
Ekonol
Epoxy resins
Fluorcarbon resins
Fluorcopolymers
Lead
Melamine resins
Nickel
Phenol resins Polyacetal resins
Polyacrylate
Polyamide (nylon)
Polybutadiene
Polybutylenerephthalate
Polycarbonate
Aromatic polyesters
Thermoplastic polyesters
Polyetheretherketones
Polyetherimides
Polyethersulfones
Polyalkenes
Polyethyleneterephthalates
Polyimides
Polyoxymethylen resins
Modified polyphenylene oxides
Polyphenylene sulfides
Polyphenylene sulfides
Polyphenylenoxides
Polyphenylsulfones
Polystyrene
Polysulfone
Polytetrafluorethylene
Polyurethane
Polyvinylchloride
Polyvinylidene fluoride
Modified polypropylene oxide
Silica
Silicon carbide
Silicon nitride
Silicone
Styrene acrylonitrile copolymers
Styrenic copolymers
Titanium
Tungsten
Urea
Vinyl ester
Rubbers and additives like:
Anti static agents
Blowing agents
Colorants
Concrete
Coupling agents
Fillers
Flame retardants
Form materials
Heat stabilizers
Hollow fillers
Lubricants
Minerals
Plasticizers
Processing aids
Silicones
Stabilizers
Superalloys
Ultraviolet absorbers
Water soluble plastics
Whiskers.

The material to be treated may for instance consist of:
Aluminium
Aluminium oxides
Aramide
Asbestos
Boron
Carbon
Colbalt
Copper
Glass
High silica and quarz
Lithium aluminium silicate
Magnesium
Nickel
Polyalkene
Silica
Silicon
Silicon carbide
Silicon nitride
Steel
Titanium
Tungsten
Zinc
Zirconia
Zirconium.

I claim:

1. A process for treating material consisting of a plurality of monofilaments with a powder treating agent, characterized in that the treating agent is suspended in a fluidized bed in a gas stream and that at least one stream of powder to be directed to the material to be treated is withdrawn from the fluidized bed by suction power and is then directed to the material to be treated under a controllable pressure, so as to separate the monofilaments and thereby treat the separated monofilaments with the treating agent.

2. A process according to claim 1, characterized in that, the stream is directed to the material to be treated with application of the venturi principle.

3. A process according to claim 1, characterized in that a plurality of streams are directed to the material to be treated from various sides, and said streams do not fully collide with each other.

4. A process according to claim 1, characterized in that the means from which the stream flows to the material to be treated is moved over this material in a reciprocating manner.

5. A process according to claim 1, characterized in that the treating agent is directly fed to the stream directed to the material to be treated in dosed amounts.

6. A process according to claim 1, characterized in that the treating agent is an impregnating agent.

7. A process according to claim 1, characterized in that the treating agent is a grinding agent for making rough the material treated with said agent in order to make the material better suitable for adherence thereon of additional agents.

8. A device for treating materials consisting of a plurality of monofilaments, with a treating agent, comprising:
means for guiding said material through a substantially open space;
means for supplying at least one stream containing a treating agent to said materials in said open space so as to separate said monofilaments and thereby expose each monofilament to said treating agent;
said means including a suction pipe having a discharge end for debouching said treating agent into said open space; and
reciprocable means for debouching said treating agent over a path through which the materials travel.

* * * * *